Inventors:
Oskar Bschorr
Detlev Kubanke

Inventors:
Oskar Bschorr
Detlev Kubanke
by Lowry Rinehart
attys.

United States Patent Office 3,446,182
Patented May 27, 1969

3,446,182
SIREN FOR THE GENERATION OF SINE WAVE SOUND AND RANDOM NOISE
Oskar Bschorr, 3 Biedersteinerstrasse, Munich 23, Germany, and Detlev Kubanke, 46 Rosenheimer Strasse, Munich 8, Germany
Filed Sept. 2, 1965, Ser. No. 484,540
Int. Cl. G10k 7/06
U.S. Cl. 116—147                 18 Claims

ABSTRACT OF THE DISCLOSURE

A noise generator for producing sine wave sound and random noise of high intensity. The generator comprises a stator having a wall with openings formed therein. A rotor having a wall with openings formed therein is mounted inside the said stator. A driving means is coupled to said rotor to rotate the rotor within the said stator structure. A means providing compressed air is included to cause air flow through said stator openings into and through said rotor openings whereby the intensity of said sound and noise is dependent upon the pressure behind the said air flow. The varying of the rotor speed generates random noise. This is accomplished by providing an elastic spring coupling means connecting the rotor driving means and the said rotor. By varying the motor moment or braking alternately, the rotor is subjected to a torsional oscillation. This oscillation is superposed to a constant speed for the motor so that the rotor speed varies rapidly. The particular sound being generated by this apparatus is a function of the particular placement of the openings or ports in the stator and rotor structures.

Background of the invention

This invention relates to a compressed-air operated siren for the generation of sine wave sound and random noise, in which the frequency and the frequency composition are variable.

For testing structural parts of aircraft for sound fatigue and for testing airborne electrical and hydraulic equipment for reliability in operation, sound generators are required which provide a great acoustic power with adjustable spectrum.

A random siren has already become known using apertured discs with the apertures therein being distributed at random. This siren has a good acoustic efficiency, it is true, but its spectrum can be varied within certain limits only. Above all, this known siren is not suitable for generating sine wave sounds.

Another known construction is the so-called air-modulated system in which an air current is modulated by varying the cross-sectional area of flow. Such a system can generate sine wave signals as well as random signals but the efficiency is unsatisfactory due to throttling losses.

It is the object of the present invention to eliminate these disadvantages by providing a siren rotor having symmetrical apertures. For the generation of sine wave vibrations this rotor will be driven at constant speed and for the generation of random noise the constant rotation will be heterodyned with a torsional vibration.

Supposing the speed of the rotor is designated by $f_0$ and the rotor is heterodyned with a sinusoidal torsional vibration having a frequency $f_1$ and an amplitude $\varphi$. The rotor is provided with $n$ apertures so that the maximum will then be at the sound frequency $nf_0$. The first lateral lines will be at the frequencies $n(f_0-f_1)$ and the second lateral lines will be at $n(f_0-2f_1)$ and $n(f_0+2f_1)$ etc. The intensity of these lines can be obtained from the Bessel functions with the appertaining phase swing $n\varphi_1$. If the rotor is heterodyned with further torsional vibrations $f_2$, $\varphi_2$; $f_3$, $\varphi_3$ etc., the lines will be further split, which results in a line spectrum which, according to the number of vibrations, is more or less close meshed. A completely blurred spectrum will be obtained if the torsional vibration takes place according to an aperiodic time function and not according to a periodic one.

There are various possibilities of obtaining such a torsional vibration. The simplest possibility is to have the driving motor of the siren drive the siren rotor through an elastic spring means. According to the invention, torsion bars, torsion springs or bending bars may be used as spring means. Another possibility is provided by the use of centrifugal pendulums eccentrically mounted on the rotor shaft. The siren motor and the centrifugal pendulums constitute a system capable of vibrating.

To excite the systems to generate torsional vibrations, the voltage applied to the driving motor may be varied as a function of time. This result in an alternating torque. If the rotor of the driving motor has a great mass moment of inertia, it will be more suitable to generate the torsional vibration by means of a variable braking moment which is applied to the rotor of the siren. Braking can be effected by means of an eddy current brake or a magnetically operated mechanical brake, respectively. Another way of obtaining a non-constant rotational speed of the siren rotor consists in that a gearing having, for example, elliptical gear wheels is interpositioned between the motor and the rotor.

As a further spring means, a pneumatic torsion spring may be used. In this case, a trapped volume of air is varied by a rotary piston. The most expedient manner to excite such a system to generate torsional vibrations is by varying the air pressure.

Brief description of drawings

Several embodiments of the invention will now be described by way of example and with reference to the accompanying drawings, in which.

Description of specific embodiment

Figure 1:
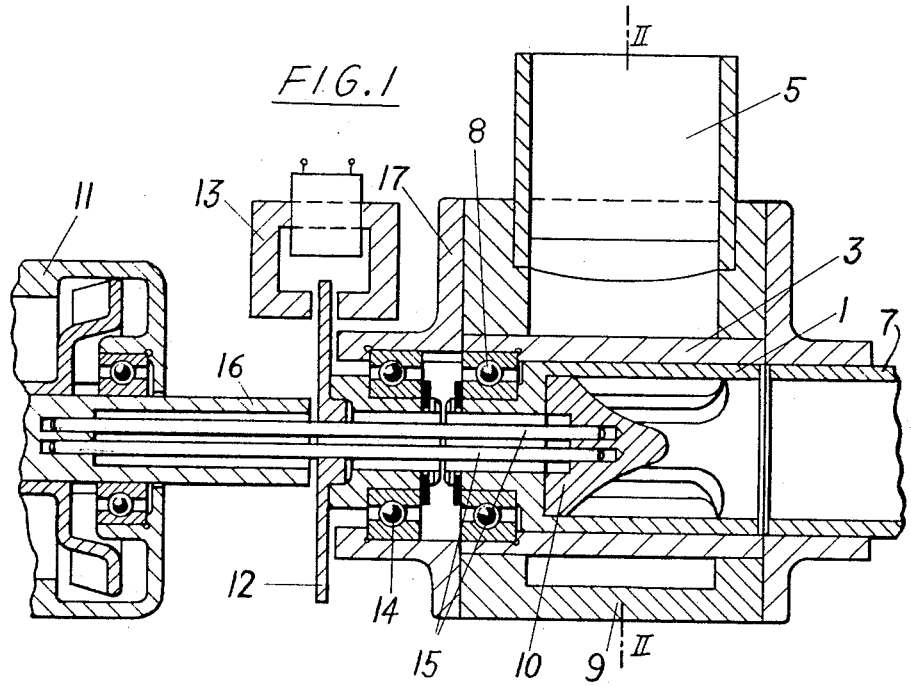
FIG. 1 is a longitudinal axial section through a siren according to the invention.
Figure 2:
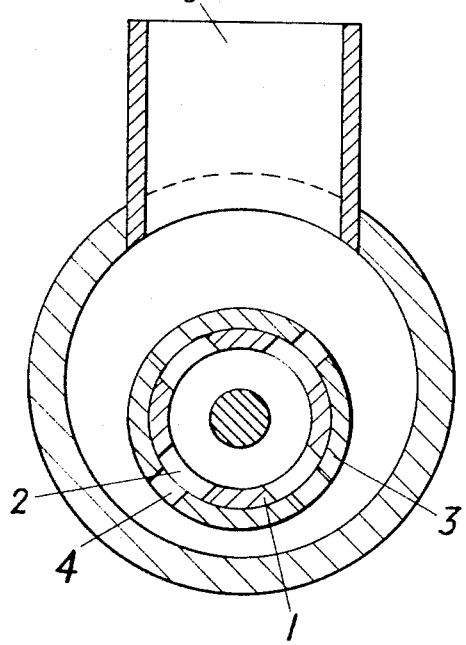
FIG. 2 is a section taken on the line II—II of FIG. 1 and showing symmetrically distributed rotor and stator apertures.

With reference now to the drawings and first to FIGS. 1 and 2, it will be apparent that a cylindrical rotor 1 is provided with openings 2 uniformly distributed around the circumference thereof. Also, openings 4 are symmetrically disposed in a stator 3 which is supplied with compressed air through a pipe 5. During rotation of the rotor 1, the openings 2 and 4 and the passage for the compressed air will be alternately opened and shut off. Flanged to the stator 3 is a coaxial siren trumpet 7. The rotor 1 is overhung mounted in the stator 3 by means of an antifriction bearing 8 or a plain sleeve bearing. The rotor 1, the bearing 8 and the stator 3 form a unit. After screwing off a flange 17, this unit can be pushed out of a jacket 9 and replaced by another unit in which the openings are arranged in a different manner. To prevent leakage air constantly entering the bearing 8, the spacing between the rotor 1 and the stator 3 is kept as small as possible. In addition, an air pressure balance is achieved through a communication with the atmosphere through which the leakage air can flow off. To obtain a controlled air passage, the jacket 9 is provided with baffle plates for deflecting the air into the openings 4. Within the rotor 1 there is arranged a guide cone 10 for deflecting the air. The rotor 1 is drivable by a motor 11 through the intermediary of a torsion spring means. In the case of a uniform drive, the rotor 1 will rotate at constant speed and thus generate a sine wave sound having a frequency depending on the number of its revolutions. When the motor 11 is driven by a varying voltage, the speed varies, too, and the elastic vibrating system will be excited to generate torsional vibrations.

As can be seen from FIG. 1, an inertia mass 12 is interpositioned between the motor 11 and the rotor 1 so that a three-mass system is obtained which has two natural frequencies. The number of natural frequencies can be increased by adding further masses.

To obtain large amplitudes it should be observed that the moments of inertia become as small as possible and that the exciting frequency corresponds as far as possible to the natural frequencies. In order to obtain a wide blurring of the spectrum, the rotor 1 must be excited with as many frequencies as possible having mutually incommensurable ratios.

The inertia mass 12 is in the form of a disc guided by a bearing 14 and arranged to rotate between the poles of an electromagnet 13.

If the electromagnet 13 is fed with alternating currents of different frequencies or a random current, the rotating inertia mass 12 will be braked by an eddy current brake, i.e. with a moment correspondingly alternating with time, thereby to excite the system to generate intensive torsional vibrations.

The torsion spring means may consist of two or more bending bars 15 which are firmly secured at one of their ends to the rotor 1. These bars 15 freely pass through two bores in the inertia mass 12 and their other ends engage loosely in blind bores in the motor 11. To provide for a small overall length, the shaft of the rotor 1 and the shaft 16 of the motor 11 are hollow and accommodate the torsion spring means. Instead of two or more bending bars 15 it is possible to use only one torsion bar as torsion spring means.

It is particularly advantageous when the power transmission of the torsion spring means at the inertia mass 12 and the motor 11 is not free from play. As is known, the vibrating system becomes non-linear by a dead angle so that with an increasing vibration amplitude also the frequency increases. Thus, through the amplitude modulation a frequency modulation can be effected at the same time, thereby to ensure the aperiodic rotor vibration, which is necessary for producing a random spectrum, to be realized in a simple manner.

If the apparatus is to be employed as a sine wave siren, the torsion spring means will have to be bridged by a rigid connection between the motor 11 and the rotor 1. In the illustrated embodiment this is rendered feasible, for example, in that the bending bars 15 can be firmly clamped by two opposite radial screws at the shaft end of the motor 11. The torsional strength of the arrangement can be considerably increased by this measure.

In some cases, e.g. if two sirens are to operate in synchronism, it is necessary that the speeds and phase positions of the rotors of the sirens be identical. This can be ensured by providing one or more bores in the inertia mass 12, which results in a surge being induced at each passing of the inertia mass 12 through the electromagnet 13. Such pulses then will be used in a manner known per se for controlling the speeds and phase positions.

If it is required that two sirens do not operate independently of each other but with a predetermined degree of correlation, the speeds of the rotors will be synchronized again, whereas their phase positions are displaced through a predetermined angle relative to each other. Moreover, the braking currents will be staggered relative to each other. The phase relationship and the degree of staggering are dependent on the required degree of correlation.

Figure 3:
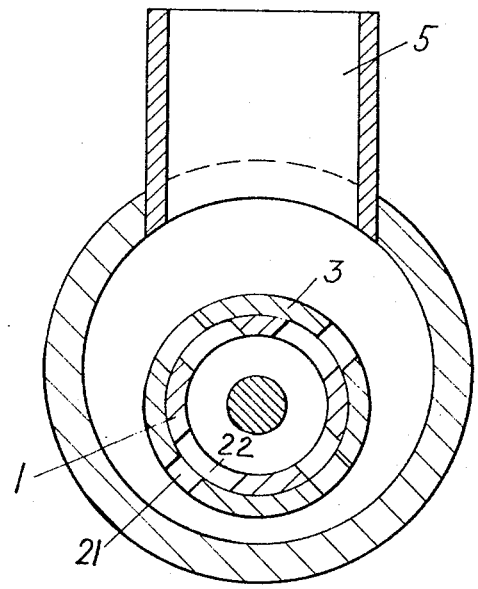
FIG. 3 is a similar section showing a random distribution of the rotor and stator apertures.

In the embodiment illustrated in FIG. 3 the stator openings and the rotor openings referenced 21 and 22, respectively, are distributed at random and have also different diameters. As for the rest, the structure of this embodiment is identical with that of the FIGS. 1 and 2 embodiment.

When the rotor is revolving at a constant speed $f$ this siren produces a line spectrum, with the individual lines thereof being located at the frequencies $f, 2f, 3f \ldots nf$. In the case of a Fourier series expansion of the shape of the cross-sectional area as a function of time, the intensity of the individual lines is identical with the Fourier coefficients. The intensity of the individual lines, consequently, can be predetermined by the size and distribution of the openings. If the rotor is additionally heterodyned with torsional vibrations, lateral lines will be split off the individual lines, which results in a largely blurred sound spectrum.

Figure 4:
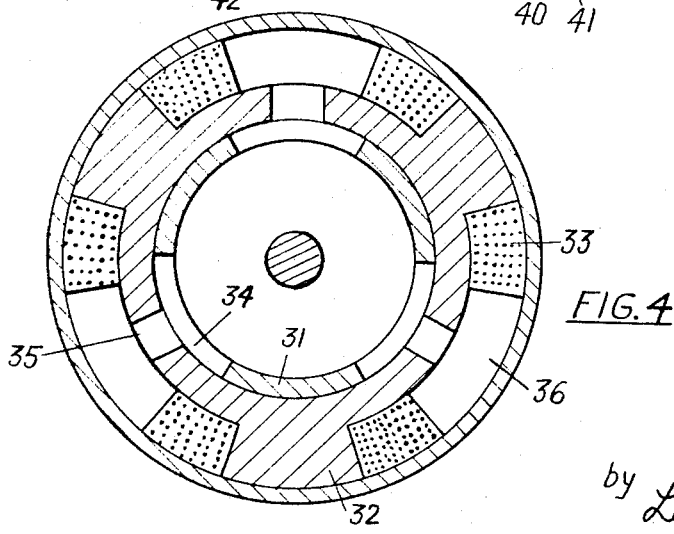
FIG. 4 is a cross section through a rotor constructed as a three-phase short-circuited rotor.

FIG. 4 shows a further embodiment in which a rotor 31 is simultaneously used as a short-circuited rotor of a three-phase motor having a stator 32 with three field coils 33. When a three-phase current is applied to the latter, the resulting rotating field causes a short-circuit current to be induced in the rotor 31, thereby to generate a torque which drives the rotor 31. Since only a relatively low input is required for overcoming the bearing and rotor frictions, no copper bars need be soldered into the rotor but it will be sufficient to make the latter of a homogeneous metallic material.

The rotor 31 and the stator 32 are provided with openings 34 and 35, respectively. Since three field coils or a multiple number thereof are required to operate the three phase motor, it is expedient to provide in each case the corresponding number of rotor and stator openings, i.e., three or a multiple thereof. In this embodiment, the compressed air will be axially supplied through air conduits 36. The mode of operation is the same as that of the siren described with reference to FIGS. 1 and 2. The structural design is also equivalent.

For generating a sine wave sound, a three-phase current of constant frequency is supplied to the field coils 33. The frequency of the three-phase current can be varied, thereby to generate sounds of eligible frequencies.

In the case of random noise generation, the three-phase current frequency varies so rapidly with time that the rotation of the rotor is heterodyned with a rotational vibration. To increase the vibration amplitude, an auxiliary mass may be elastically coupled with the rotor.

Figure 5:
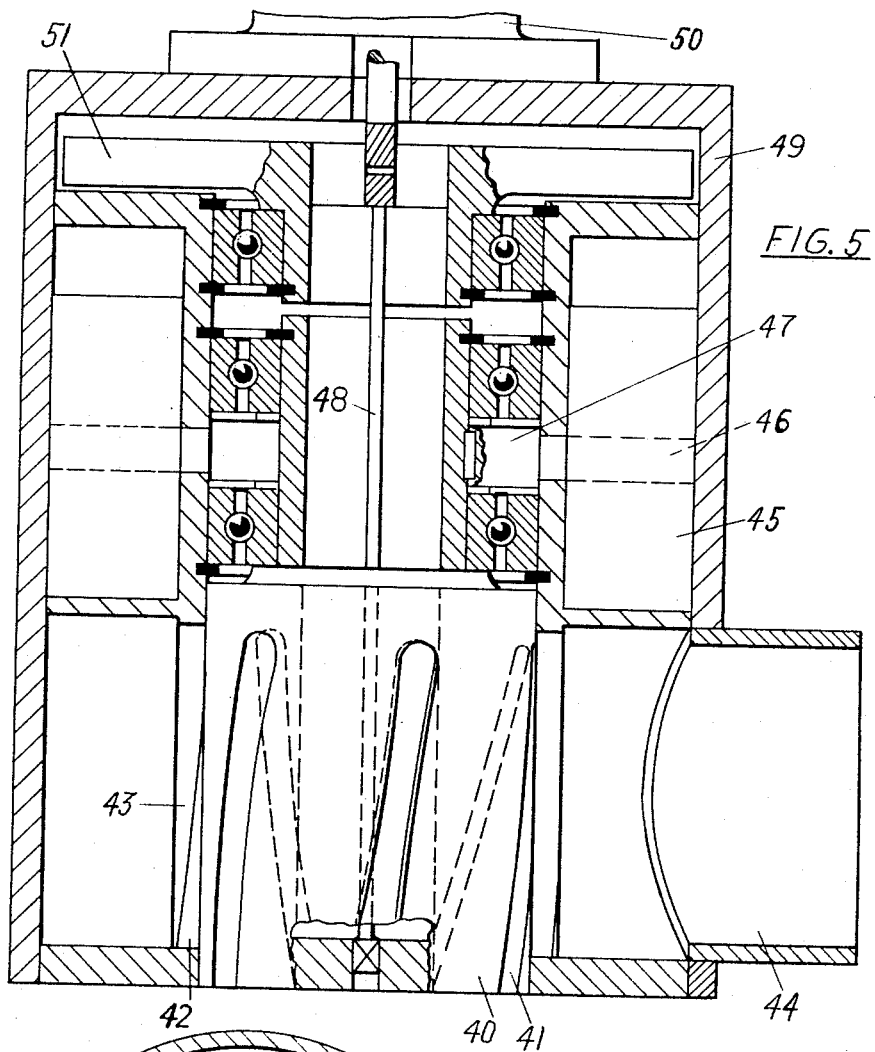
FIG. 5 is a vertical section through another embodiment of the invention.

In the embodiment of FIG. 5, a rotor 40 is provided with inclined slots 41 having a cross-sectional area increasing downstream, and a stator 42 with inclined slots 43. The compressed air is supplied through a pipe designated by the reference numeral 44. During the rotation of the rotor, the slots are alternately opened and closed. The escaping air is given an angular momentum by the inclination of the slots and thus drives the rotor 40. Between the rotor 40 and a flywheel mass 51 there is provided a resilient torsion spring means 48. The speed control of the rotor is obtained by means of a compressed-air motor 50. An electromagnet comprising an iron core 46 and a coil 45 causes a ring 47 mounted on the rotor shaft and thus the rotor 40 to be braked with varying force, thereby to excite the spring-mass-system to generate torsional vibrations. In this arrangement, the magnetic flux of the electromagnet is closed by a casing 49.

In addition to the resilient spring means which serve as energy storage means, a centrifugal pendulum may also be employed. A centrifugal pendulum is eccentrically mounted on the rotor shaft by means of either a friction or antifriction bearing. During rotation there will result a vibrating system having a frequency depending on the rotor speed, the eccentricity and the unbalance of the pendulum.

With large vibration amplitudes, this vibrating system is non-harmonic so that the vibration frequency can be constantly varied through the amplitude. Thus the vibration is made largely aperiodic and the spectrum of the siren becomes a continuous random spectrum.

For the balancing of the masses, it is advantageous to provide a second centrifugal pendulum opposite the first one, i.e. in a position which is angularly displaced through 180° relative to the position of the first pendulum. This second pendulum may be similar to the first one. However, by differently choosing the unbalance and the eccentricity, the resulting vibration amplitudes on the rotor may be increased. The number of natural frequencies of the system will be increased with the number of pendulums.

To superpose an additional rotary motion upon the rotor of the siren, so-called elliptical gearings may be used. The more elliptical transmission ratios are incorporated therein, the greater is the number of the lateral lines in the frequency spectrum. The intensity and frequency of such lateral lines results from phase swing and frequency of the torsional movement.

Such an elliptical gearing includes a first friction wheel body having a contacting track running obliquely to the axis of rotation. A second tapered friction wheel body is driven by the first friction wheel body. The contact point owing to the oblique contact track periodically wanders to and fro on the surface line. Therefore, the transmission ratio will be varied according to the ratio of the radii. By connecting a plurality of such gear elements in series, several torsional motions of eligible frequency and phase swing can be realized.

A known switching mechanism may be included to provide only constant transmission ratios when generating sine wave sound while the elliptical gears are in an idling setting.

The invention may be embodied in other specific forms without departing from the spirit or essential characteristics thereof. The present embodiments are therefore to be considered in all respects as illustrative and not restrictive.

We claim:

1. A noise generator for producing sine wave sound and random noise comprising:
   (a) a stator having a wall with openings formed therein,
   (b) means mounting a rotor within said stator, said rotor having a wall with openings formed therein,
   (c) an elastic spring means coupling a driving means to said rotor, and
   (d) means supplying compressed air to cause airflow through said stator openings into and through said rotor openings whereby the intensity of said sound and noise is dependent upon the pressure behind said airflow.

2. A noise generator as defined in claim 1, further including a means controlling the amount of elasticity in said spring coupling means.

3. A noise generator as defined in claim 1 wherein said stator openings have substantially equal diameters and are located symmetrically around said stator wall, and said rotor openings have substantially equal diameters and are located symmetrically around said rotor wall.

4. A noise generator as defined in claim 1 wherein said stator openings have different diameters and are located at random around said stator wall, and said rotor openings have different diameters and are located at random around said rotor wall.

5. A noise generator as defined in claim 1 wherein said stator openings are inclined slots and said rotor openings are inclined slots having a cross-sectional area increasing downstream, causing said airflow to receive an angular momentum to drive said rotor.

6. A noise generator as defined in claim 1, further including means providing a torsional vibration to said rotor.

7. A noise generator as defined in claim 6 wherein said driving means comprises an electric motor and said vibration means includes a means for varying voltage of said motor as a function of time.

8. A noise generator as defined in claim 6 wherein said vibration means includes at least one centrifugal pendulum eccentrically and rotatably mounted on said coupling means to generate said torsional vibration.

9. A noise generator as defined in claim 6 wherein said vibration means includes a gearing connected between said rotor and said driving means,
   said gearing having elliptical transmission ratios.

10. A noise generator as defined in claim 6 wherein said elastic coupling means includes at least one bending bar firmly clamped at one end and freely rotatable at the other end thereof.

11. A noise generator as defined in claim 6 wherein the said elastic coupling means includes a torsional bar.

12. A noise generator as defined in claim 6 wherein said coupling means includes a pneumatic torsion spring and
   said vibration means includes a means for varying pneumatic pressure to said spring to generate said torsional vibrations.

13. A noise generator as defined in claim 6 wherein said rotor is a short-circuited rotor of a three-phase motor,
   field coils of said motor are mounted on said stator adjacent said stator openings, and
   said compressed air supply means includes axial conduits in said stator between said field coils.

14. A noise generator as defined in claim 6 wherein said generator includes a hollow motor shaft and a hollow rotor shaft, and
   said elastic coupling means are mounted inside each of said shafts to reduce the overall axial length of said generator.

15. A noise generator as defined in claim 6 wherein said vibration means includes an inertia mass connected to said coupling between said rotor and rotor driving means, and a means providing a braking force as a function of time to said mass thereby causing torsional vibration.

16. A noise generator as defined in claim 15 wherein said braking force means includes an electromagnet acting on said inertia mass to provide an eddy current induced braking torque to said rotor.

17. A noise generator as defined in claim 15 wherein said braking force means includes a mechanical brake.

18. A noise generator as defined in claim 15 wherein said spring coupling means, said driving means, said inertia mass and said rotor have a dead angle relationship to generate a non-linear vibration characteristic.

References Cited

UNITED STATES PATENTS

| | | | |
|---|---|---|---|
| 2,110,505 | 3/1938 | Ekman | 116—147 |
| 2,535,520 | 12/1950 | Russell | 116—147 |

LOUIS R. PRINCE, *Primary Examiner.*

J. W. ROSKOS, *Assistant Examiner.*

U.S. Cl. X.R.

340—405